Figure 1:
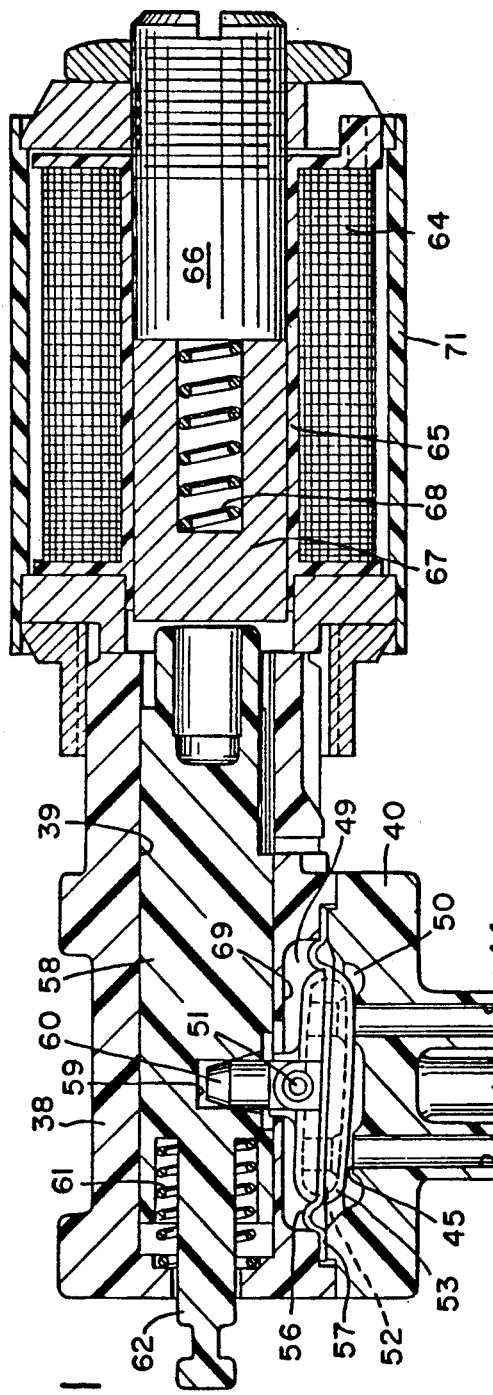

United States Patent [19]
Baker

[11] Patent Number: 5,205,323
[45] Date of Patent: Apr. 27, 1993

[54] VALVE AND OPERATOR THEREFOR

[75] Inventor: Joseph W. Baker, Sommerville, N.J.

[73] Assignee: Automatic Switch Company, Florham Park, N.J.

[21] Appl. No.: 854,879

[22] Filed: Mar. 18, 1992

[51] Int. Cl.$^5$ .................. F16K 11/052; F16K 31/10
[52] U.S. Cl. .................. 137/625.44; 251/129.2; 137/875
[58] Field of Search .................. 137/625.44, 875; 251/337, 129.2, 129.15

[56] References Cited

U.S. PATENT DOCUMENTS

| | | | |
|---|---|---|---|
| 2,570,450 | 10/1951 | Hottenroth | 251/129.2 |
| 4,830,332 | 5/1989 | Miura et al. | 251/129.5 X |
| 4,986,308 | 1/1991 | Champseaux | 137/625.44 |
| 5,027,857 | 7/1991 | Champseix | 137/625.44 |

Primary Examiner—Arnold Rosenthal
Attorney, Agent, or Firm—Fiddler Levine & Mandelbaum

[57] ABSTRACT

A valve including a valve member having two different stable positions, and a valve operator for shifting the valve member between its two stable positions and holding the valve member in those positions. The valve operator includes a shuttle moveable between two extreme positions corresponding to the two stable positions, respectively, of the valve member. A first spring urges the shuttle toward one of its extreme positions and a second spring, stronger than the first spring, urges the shuttle toward the other of its extreme positions, these movements of the shuttle being transmitted to the valve member. A device, such as an electric solenoid, selectively renders the second spring ineffective with respect to the shuttle, so that when the second spring is ineffective the first spring causes the valve member to assume one of its stable positions, and when the second spring is not ineffective, the second spring causes the valve member to assume the other of its stable positions.

10 Claims, 1 Drawing Sheet

VALVE AND OPERATOR THEREFOR

This invention relates to valves of the type including a valve member which shifts between two stable positions under the influence of a valve operator. The invention is particularly applicable to a three-way valve, in which the valve member closes one or another of two outlet ports in its two stable positions.

The invention will be described with reference to the type of valve shown and described in U.S. Pat. No. 5,027,857. The valve illustrated in that patent is of the three-way type, including a fluid inlet port and two outlet ports. The valve includes a rocker valve member which swings between two stable positions in which it closes one or the other of the outlet ports, the inlet port being constantly open.

A valve operator rocks the valve member between its two stable positions. The operator includes a shuttle slidable between two extreme positions, corresponding to the two stable positions, respectively, of the rocker-valve member. A compression spring constantly urges the shuttle in one direction, so as to cause the valve member to close one outlet port and open the other. An electric solenoid causes the shuttle to move in the opposite direction, against the force of the spring, so as to swing the rocker valve member into its other stable position wherein it closes the outlet port previously open and opens the outlet port previously closed.

Axially arranged within the solenoid are a stationary armature, or plugnut, and a moveable armature, moveable toward and away from the plugnut. In the valve of the patent identified above, when the solenoid is energized, the moveable armature moves toward the plugnut and pulls the shuttle so as to shift the rocker valve member into one of its stable positions. Movement of the moveable armature terminates just before it reaches the stationary armature. The moveable armature cannot be allowed to engage the plugnut, since if it did make contact, it would not be possible to obtain reliable seating of the valve member. However, with only a small gap between the plugnut and armature, the armature is pulled with great force toward the plugnut, resulting in the valve member being pressed with great force against the valve seat of the outlet port. Such a large force pressing on the rubbery material of the valve member tends to shorten the life of the valve member, and hence the valve.

It is an object of the present invention to overcome this problem by providing a valve in which the closing force on the valve member is sufficient to hold the valve member against a valve seat, but not overly strong so as to unnecessarily shorten valve life.

It is another object of the invention to provide such a valve operable by an electric solenoid, but in which the solenoid armature is not used to directly move the valve member into either of its stable positions.

It is a further object of the invention to provide such a valve in which springs are employed to shift the valve member between its two stable positions and to hold the valve in those positions.

It is an additional object of the invention to provide such a valve wherein when the solenoid is energized, the moveable armature is permitted to seat against the plugnut, leaving no gap between the armature and plugnut.

Additional objects and features of the invention will be apparent from the following description, in which reference is made to the accompanying drawings.

Figure 2:
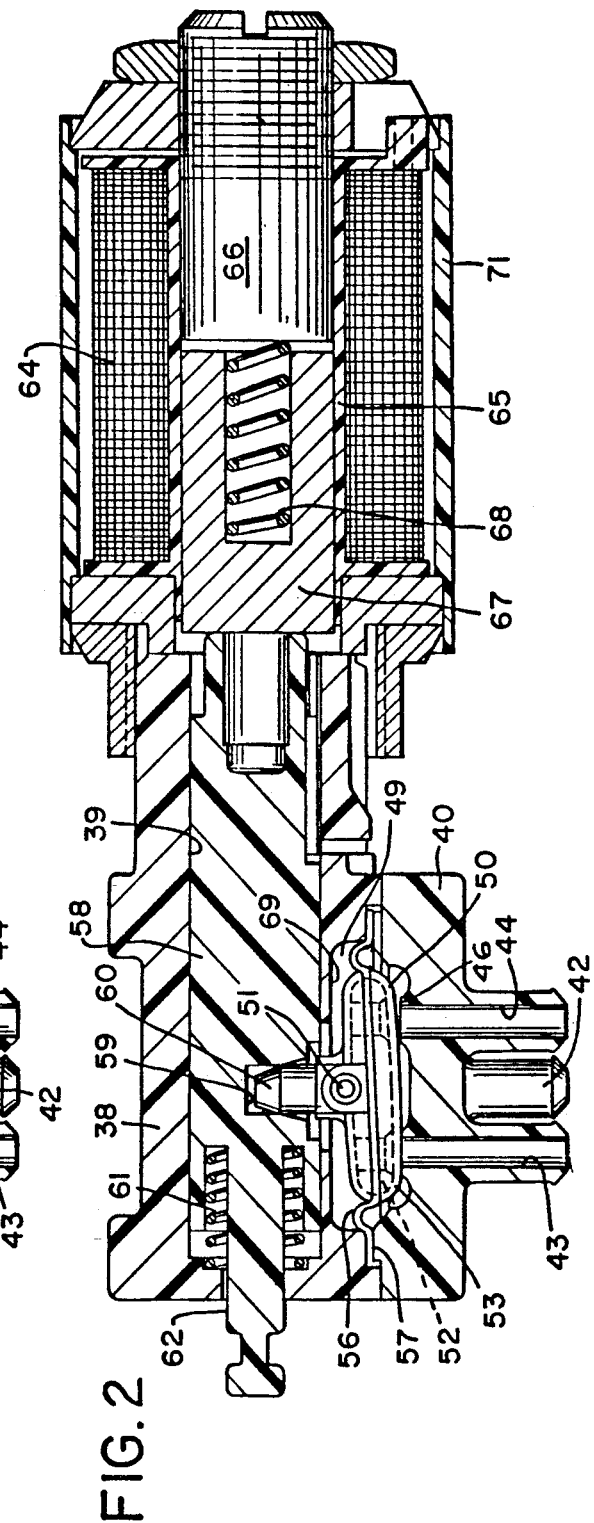

In the drawings:

FIG. 1 is a longitudinal, cross-sectional view of a valve according to the present invention, the solenoid being energized; and FIG. 2 is a view similar to FIG. 1 showing the condition of the valve when the solenoid is deenergized.

The valve chosen to illustrate the present invention includes a valve body 38 formed with an internal cylindrical bore 39. A bonnet 40 is secured to the valve body by bolts (not shown) which pass through holes in the bonnet and are threaded into tapped holes in the valve body.

Bonnet 40 is formed with a pressurized fluid inlet port 42 and two outlet ports 43 and 44. The inner end of port 43 is surrounded by a valve seat 45, and the inner end of outlet port 44 is surrounded by a valve seat 46.

All three ports open into a valve chamber 49 defined between valve body 38 and bonnet 40. Accommodated within chamber 49 is a rocker valve member 50 pivotally mounted for rocking movement on an axle 51 extending perpendicular to the longitudinal direction of cylinder 39. Rocker valve member 50 includes a core 52 of rigid material encapsulated within a resilient, rubbery material 53.

A diaphragm 56 of limp, flexible, and rubbery material surrounds valve member 50 and extends radially between the valve member and the valve body. Diaphragm 56 may be an integral extension of encapsulation material 53. The radially outward margin 57 of diaphragm 56 is squeezed tightly between valve body 38 and bonnet 40.

The operator for operating the valve includes a shuttle 58 slidable longitudinally within cylinder 39 formed in valve body 38. Shuttle 58 is formed with a crosswise bore 59 which accommodates a rigid stem 60 projecting from core 52 of valve member 50. Longitudinal movement of the shuttle 58 within cylinder 39 is converted into rocking movement of valve member 50 by means of cooperation between bore 59 and stem 60.

A compression spring 61, within cylinder 39, surrounds a pin 62 projecting from shuttle 58. One end of spring 61 is seated against an end wall of cylinder 39, and the other end is accommodated within an annular groove in the shuttle, surrounding pin 62, and seated against the bottom of that groove. Spring 61 constantly urges shuttle 58 toward the right, as viewed in the drawings.

Mounted on the end of valve body 38, opposite the end at which spring 61 is located, is a cylindrical housing 71 within which is located a solenoid coil 64 wound about an axially extending core tube 65. Fixed within the end of tube 65 remote from shuttle 58 is a stationary armature, or plugnut, 66. Slidable within core tube 65, toward and away from plugnut 66, is a moveable armature 67. A compression spring 68 is accommodated within an axial bore in moveable armature 67, one end of the spring seating against plugnut 66, and the other end of the spring seating against the floor of the bore. Spring 68 is stronger than spring 61, and preferably twice as strong. In other words, the force with which spring 61 urges shuttle 58 toward the right is substantially one half the force with which spring 68 urges armature 67 toward the left.

In use, inlet port 42 is connected to a source of fluid pressure, and outlet ports 43 and 44 are connected to environments which are to alternatively receive the pressurized fluid entering chamber 49 through port 42. When solenoid 64 is energized, moveable armature 67 is attracted to plugnut 66, and moves into engagement with the plugnut against the force of spring 68, as shown in FIG. 1. As a result, spring 61 is free to shift shuttle 58 toward the right so as to bring valve member 50 into engagement with valve seat 46, to close outlet port 44. At the same time, outlet port 43 is opened. Note that in this condition, shuttle 58 is spaced from armature 67, so that the armature and spring 68 have no effect on the shuttle.

When solenoid 64 is deenergized, spring 68 is free is move armature 67 toward the left. The armature immediately engages the end of shuttle 58 and pushes the shuttle, against the force of spring 61, toward the left and into the condition shown in FIG. 2, wherein valve member 50 engages valve seat 45, so as to close outlet port 43 and open outlet port 44.

It will be appreciated that in the condition shown in FIG. 1, the only force on valve member 50 serving to cause closure of outlet port 44 is provided by spring 61, and in the condition of FIG. 2, the only force on valve member 50 serving to close outlet port 43 is the force provided by spring 68. In fact, in this latter case, the force applied to valve member 50 is actually the force provided by spring 68 less the opposing force being applied to shuttle 58 by lighter spring 61. Because spring 68 exerts twice the force of spring 61, the force applied to valve member 50 in both of its stable positions, shown in FIGS. 1 and 2, is the same. The reason is that in the FIG. 1 position, only the force of spring 61 is applied to the valve member, and in the FIG. 2 position, the force of spring 68 minus the force of spring 61 is applied to the valve member. Since the force exerted by spring 68 is twice that of the force exerted by spring 61, the resultant force applied to valve member 50 in the FIG. 2 position is equal to the force of spring 61 applied to the valve member in the FIG. 1 position.

It will be seen that, according to the present invention, the solenoid/armature arrangement 64, 66, 67 is not employed to urge valve member 50 into either of its stable positions. Instead, the function of the solenoid/armature arrangement is to selectively render spring 68 ineffective with respect to shuttle 58 so that spring 61 can act upon the shuttle and move valve member 50 to one of its stable positions.

The invention has been shown and described in preferred form only, and by way of example, and many variations may be made in the invention which will still be comprised within its spirit. It is understood, therefore, that the invention is not limited to any specific form or embodiment except insofar as such limitations are included in the appended claims.

I claim:

1. A valve including a valve member having two different stable positions, the valve including two ports, each surrounded by a valve seat, the valve member engaging one of the valve seats when in one of its stable positions, and the valve member engaging the other valve seat when in the other of its stable positions, and a valve operator for shifting the valve member between its two stable positions and holding the valve member in those positions, the valve operator comprising:

a shuttle moveable between two extreme positions corresponding to the two stable positions, respectively, of the valve member, means for transmitting movement of the shuttle to the valve member, a first spring for urging the shuttle toward one of its extreme positions, a second spring, stronger than the first spring, for urging the shuttle toward its other extreme position, and means for selectively rendering the second spring ineffective with respect to the shuttle, whereby, when the second spring is ineffective the first spring causes the valve member to assume one of its stable positions, and when the second spring is not ineffective the second spring causes the valve member to assume the other of its stable positions.

2. A valve as defined in claim 1 wherein the first and second springs are of such relative strength, and so relatively positioned, that they cooperate to apply substantially equal forces to the valve member when the latter is in both of its stable positions.

3. A valve as defined in claim 1 wherein the first and second springs urge the shuttle in opposite directions, and the second spring applies to the shuttle substantially twice the force applied to the shuttle by the first spring.

4. A valve as defined in claim 1 wherein the means for rendering the second spring ineffective is arranged to apply no force to the shuttle, beyond the force applied by the second spring, when the valve member is in either of its stable positions.

5. A valve as defined in claim 1 wherein the means for rendering the second spring ineffective includes a member moveable to a position in which it prevents the force of the second spring from acting on the shuttle.

6. A valve as defined in claim 1 wherein the means for rendering the second spring ineffective includes a solenoid and an armature moveable within the solenoid between two extreme positions occupied by the armature when the solenoid is energized and deenergized, respectively, the two extreme positions of the armature corresponding to the two stable positions of the valve member, the armature preventing the force of the second spring from acting on the shuttle when the armature is in one of its extreme positions, and the armature permitting the force of the second spring to act on the shuttle when the armature is in its other extreme position.

7. A valve as defined in claim 6 wherein the armature is movable toward and away from the shuttle between the two extreme positions of the armature, the force of the second spring being transmitted by the armature to the shuttle when the armature is in one of its extreme positions, and the force of the second spring being prevented from acting on the shuttle when the armature is in its other extreme position.

8. A valve as defined in claim 7 wherein the armature is spaced from the shuttle when the armature is in said one of its extreme positions, and the armature engages the shuttle when the armature is in said other of its extreme positions.

9. A valve as defined in claim 1 wherein the only force for holding the valve member against one of the valve seats is that provided by the first spring, and the only force for holding the valve member against the other valve seat is that provided by the second spring.

10. A valve as defined in claim 9 wherein the only force for holding the valve member against the other valve seat is the difference between the forces applied to the shuttle by the first and second springs.

* * * * *